(No Model.)  L. H. SMITH.  2 Sheets—Sheet 1.
CULTIVATOR.
No. 578,660.  Patented Mar. 9, 1897.
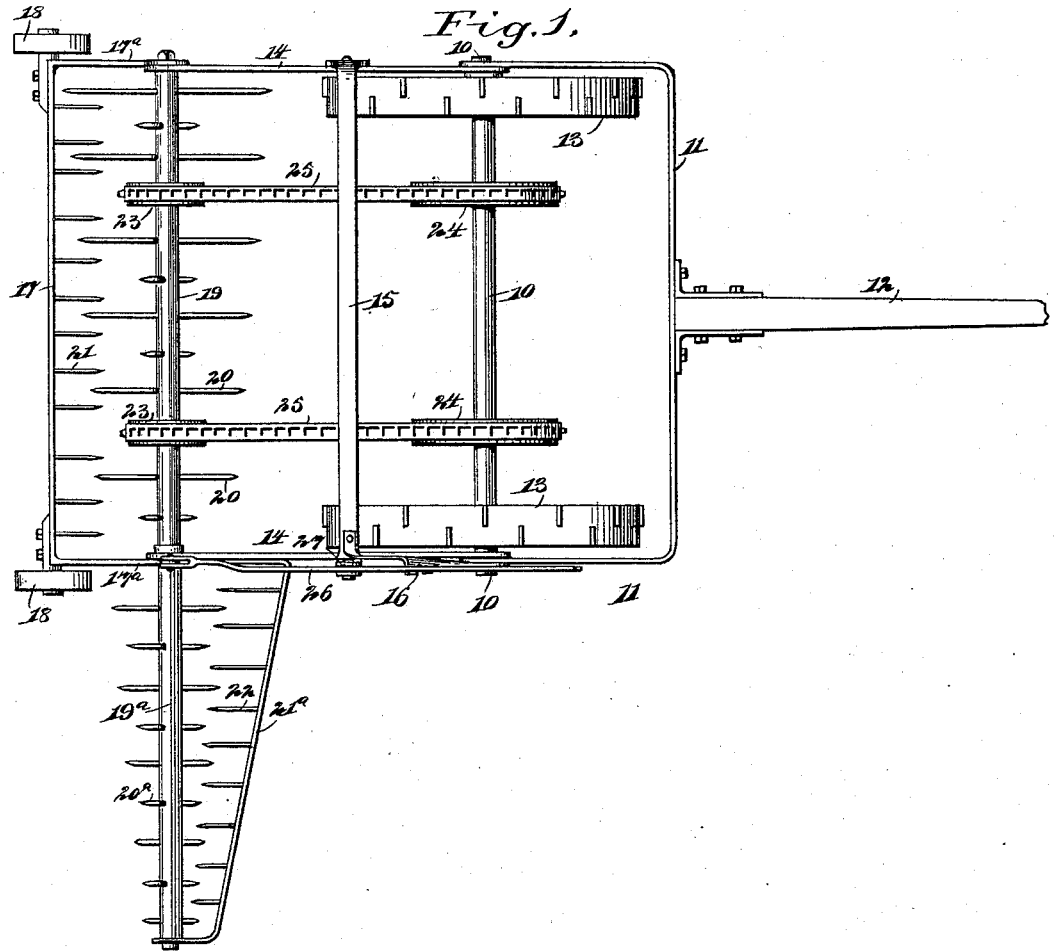
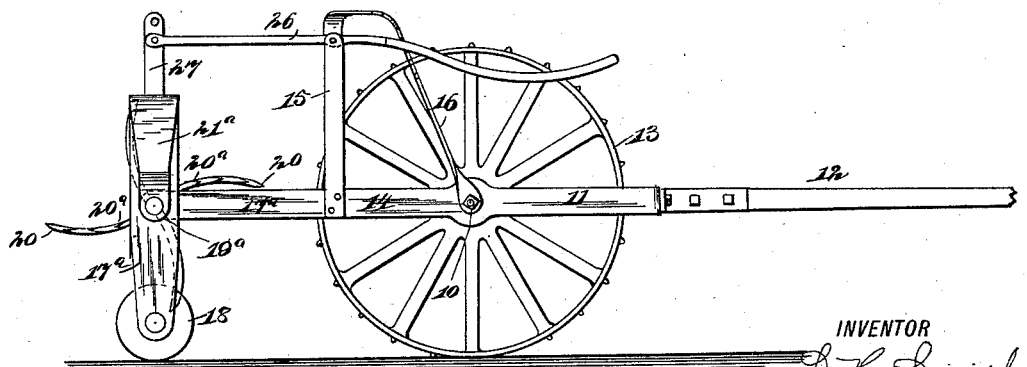
WITNESSES:  INVENTOR
L. W. Legendre  L. H. Smith
  BY
  Munn & Co.
  ATTORNEYS.

(No Model.) 2 Sheets—Sheet 2.

L. H. SMITH.
CULTIVATOR.

No. 578,660. Patented Mar. 9, 1897.

WITNESSES:

INVENTOR

BY

ATTORNEYS.

UNITED STATES PATENT OFFICE.

LOUIS H. SMITH, OF EL CAJON, CALIFORNIA.

CULTIVATOR.

SPECIFICATION forming part of Letters Patent No. 578,660, dated March 9, 1897.

Application filed July 10, 1896. Serial No. 598,718. (No model.)

*To all whom it may concern:*

Be it known that I, LOUIS H. SMITH, of El Cajon, in the county of San Diego and State of California, have invented a new and useful Improvement in Cultivators, of which the following is a full, clear, and exact description.

My invention relates particularly to a cultivator adapted to work the ground around trees, especially orange, lemon, and olive trees; and the object of the invention is to so construct the cultivator that it will stir and cultivate the ground close to the trunks of the trees, not interfering in the least with the roots; and a further object of the invention is to provide a cultivator for the purpose described which will be very simple, durable, and economic, and so formed that when it is to be carried from the orchard or to the same the cultivator-teeth will be raised free from the ground and the frame of the machine will be wheel-supported at both the front and at the rear.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 2:
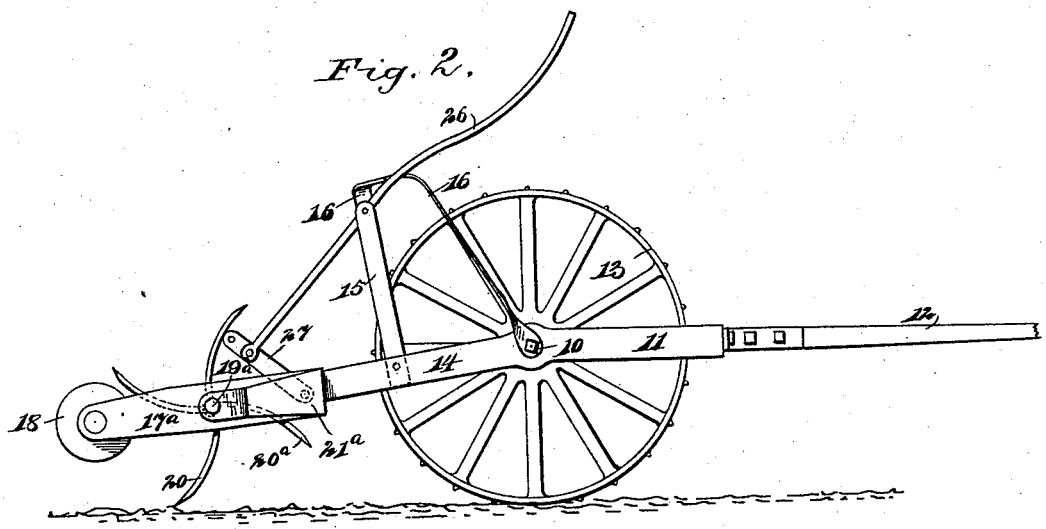
Figure 3:
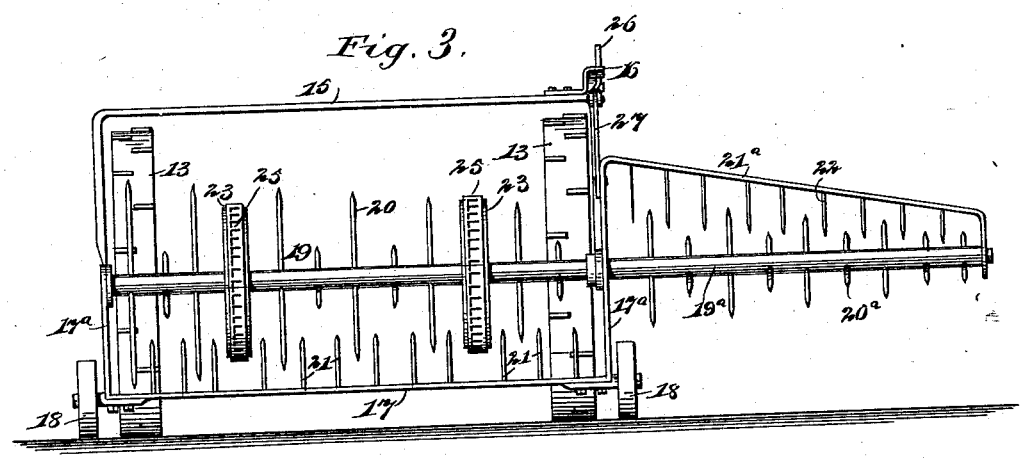

Figure 1 is a plan view of the improved cultivator in a position for work. Fig. 2 is a side elevation of the cultivator when in the position shown in Fig. 1. Fig. 3 is a rear elevation of the cultivator in the position to be carried to and from the field or orchard, and Fig. 4 is a side elevation of the cultivator when in the position shown in Fig. 3.

In carrying out the invention the axle 10 is journaled in the members of a substantially U frame 11, to the front portion of which frame the pole or tongue 12 of the machine is attached. The ground-wheels 13 are secured upon the axle and preferably have roughened peripheral surfaces, as shown in the drawings. An arm 14 is pivotally attached to each side member of the front frame 11, the axle being the pivot for the said arms, and the arms form continuations rearward of the front of the draft-frame. These laterally-extending arms are strengthened and braced by a bar 15, bowed or curved in an upwardly direction.

A rack 16 is pivoted at one end of the axle 10, and extends upwardly and rearwardly ordinarily to an engagement with the top portion of the bowed bar 15. A cleaner-frame 17, preferably consisting of a transverse rear bar and side bars or arms 17ª, is pivotally connected through the medium of the said arms or side members 17ª with the arms 14 extended from the main or draft frame 11, and from each side of the rear portion of the cleaner-frame 17 the journals of small wheels 18 are projected, as clearly shown in Figs. 1 and 3. The pivotal connection between the cleaner-frame and the extension-arms 14 of the front or draft frame is effected ordinarily through the medium of a cultivator-shaft 19, and this shaft is provided with a number of radially-disposed teeth 20, which are preferably curved in such manner that as the shaft revolves the concaved surfaces of the teeth will be presented to the rear, and the said teeth are preferably placed on the shaft in pairs, the teeth of a pair being oppositely disposed or extending beyond opposite sides of the shaft.

The shaft 19 is provided with an extension-section 19ª, which is coupled to the main shaft 19 in any suitable or approved manner, so that the two sections will turn together, and the extension-section 19ª of the cultivator-shaft is at the right-hand side of the frame of the machine, the teeth 20ª on the shaft 19ª being of the same character as the teeth 20; but the teeth 20ª are graduated in length, being the longest adjacent to the main frame, or shortest at the outer end of the aforesaid auxiliary cultivator-shaft, and the teeth 20 on the main cultivator-shaft 19ª may likewise be graduated in length, and are so shown, so as to form a continuation of the graduations of the teeth on the auxiliary or extended section of the cultivator.

The auxiliary cultivator-shaft 19ª is supported by a yoke-frame 21ª, which is secured to the right-hand member of the cleaner-frame and extends laterally outwardly therefrom, tapering in direction of the rear, and the said extension-frame 21ª is provided with a rearwardly-extending section at its outer end, in which the outer extremity of the auxiliary cultivator-shaft 19ª is journaled.

In the main or rear bar of the cleaner-frame 17 a series of forwardly-extending teeth 21 is secured, the cleaner-teeth 21 being so placed that the cultivator-teeth will pass between them, and the cultivator-teeth 20ª on the extension or auxiliary section 19ª of the cultivator-shaft pass between cleaner-teeth 22, extending rearwardly from the auxiliary frame 21ª.

Sprocket-wheels 23 or their equivalents are secured upon the main cultivator-shaft 19, and larger wheels 24 of a corresponding character are secured to the axle 10, and longitudinally-alining wheels 23 and 24 are connected by belts 25, whereby rotary motion is imparted to the cultivator-shaft 19 and its extension 19ª by means of the rotation of the axle 10.

The cleaner-frame is raised and lowered through the medium of a lever 26, usually fulcrumed upon the right-hand end of the bowed bar 15, connected with the arms 14 of the front section of the frame, and this lever 26 at its rear end is connected through the medium of a link 27 with a forwardly-extending side member of the rear or main cleaner-frame 17, so that when the machine is to be carried from the field or is to be taken to the field, by drawing the lever 26 downward, as shown in Fig. 4, the cleaner-frame will be carried to a substantially vertical position, bringing the small wheels 18 in engagement with the ground and carrying the teeth of the main cultivator-shaft and the teeth on the extension of the said shaft out of possible engagement with the ground, the extension-yoke 21ª being then in a vertical position, as shown in Fig. 3. The cleaner-teeth 21 and 22 serve to clean the cultivator-teeth.

When the machine reaches the field, the lever 26 is carried to the upper position shown in Fig. 2, and the cleaner-frame and the attached yoke-frame 21ª are brought to a horizontal position, enabling the cultivator-teeth to enter the ground. Under this construction of the cultivator all of the space between the rows of trees and the space underneath the lower limbs of the trees up to the trunks of said trees may be readily, conveniently, and perfectly cultivated, and at any time if the extension of the main cultivator-shaft is not needed it may be readily removed.

Having thus described my invention, I claim as new and desire to secure by Letters Patent—

1. In a cultivator, a draft-frame, a pivoted extension from the same, a cultivator-shaft journaled in the extension from the draft-frame, a cleaner-frame having pivotal connection with the extension from the draft-frame, and means for raising and lowering the cleaner-frame, substantially as described.

2. In a cultivator, a cultivator-shaft the main portion whereof is journaled in the frame of the machine, an extension for the said cultivator-shaft projected beyond a side of the frame, and cleaner-teeth arranged to receive between them the cultivating-teeth of the cultivator-shaft and the extension thereof, substantially as shown and described.

3. The combination, with a frame, an axle journaled therein, supporting-wheels carried by the said axle, and a cultivator-shaft journaled in the rear portion of the said frame, having radially-disposed teeth, of an extension from the cultivator-shaft, likewise provided with radial teeth, a cleaner-frame pivotally connected with the main frame, the teeth of the said cleaner-frame being arranged to alternate with the teeth of the cultivator-shaft and its extension, and an adjusting device for raising and lowering the said cleaner-frame, as and for the purpose set forth.

4. The combination, with a frame, an axle journaled therein, supporting-wheels carried by the said axle, and a cultivator-shaft journaled in the rear portion of the said frame, having radially-disposed teeth, of an extension from the cultivator-shaft, likewise provided with radial teeth, a cleaner-frame pivotally connected with the main frame, the teeth of the said cleaner-frame being arranged to alternate with the teeth of the cultivator-shaft and its extension, an adjusting device for raising and lowering said cleaner-frame, the teeth of the cultivator-shaft being graduated in length in direction of the outer end of the extension of the main cultivator-shaft, the cleaner-frame being given a corresponding inclination to the line of graduation of the cultivator-teeth, and wheels located upon the rear main portion of the cleaner-frame, as and for the purpose set forth.

5. A cultivator having a main frame formed of two pivotally-connected sections, a tongue connected to one section, a cultivator-shaft journaled in the second section, a cleaner-frame pivotally connected to said second section, and means for changing the relative positions of the said second section and the cleaner-frame, substantially as described.

6. A cultivator having a main frame formed of two pivotally-connected sections, a cultivator-shaft journaled in one of said sections and projected beyond the section, a cleaner-frame pivoted to said section, a yoke-frame extending with the extension of the cultivator-shaft and moving in unison with the cleaner-frame, and means for changing the relative positions of the yoke and cleaner frames with the section of the main frame to which the cleaner-frame is pivoted, substantially as described.

7. A cultivator having a main frame, wheels for carrying the main frame, a transverse cultivator-shaft revolubly mounted in the main frame and extending beyond one side of the same to form an auxiliary cultivator-shaft, means for driving the cultivator-shaft, cultivator-teeth secured to the cultivator-shaft, a cleaner-frame pivoted to the main frame, an auxiliary cleaner-frame extending outward with the auxiliary cultivator-shaft and connected to move with the first-named cleaner-frame and cleaner-teeth secured to the cleaner-frames and coacting with the cultivator-teeth, substantially as described.

LOUIS H. SMITH.

Witnesses:
ALBERT BROUNER,
J. E. LINDSTROM.